Feb. 24, 1970          A. RYEY          3,497,180
VALVE HEAD WITH SELECTIVELY EXPANDABLE PERIPHERY
Filed Oct. 7, 1968
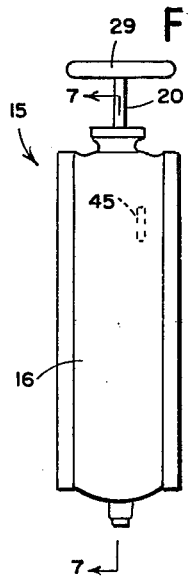
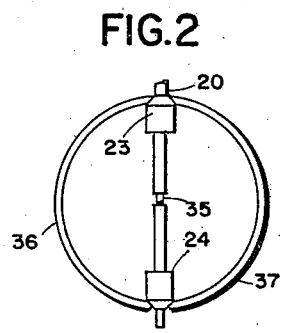
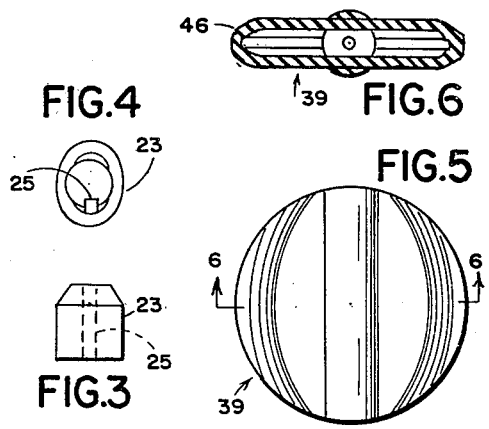
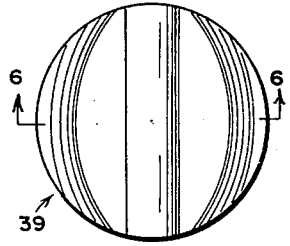
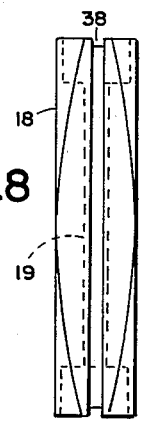
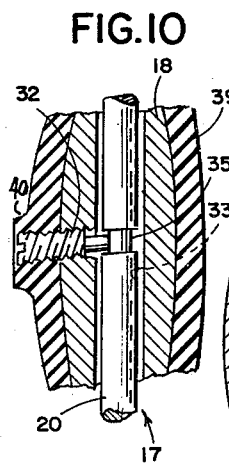
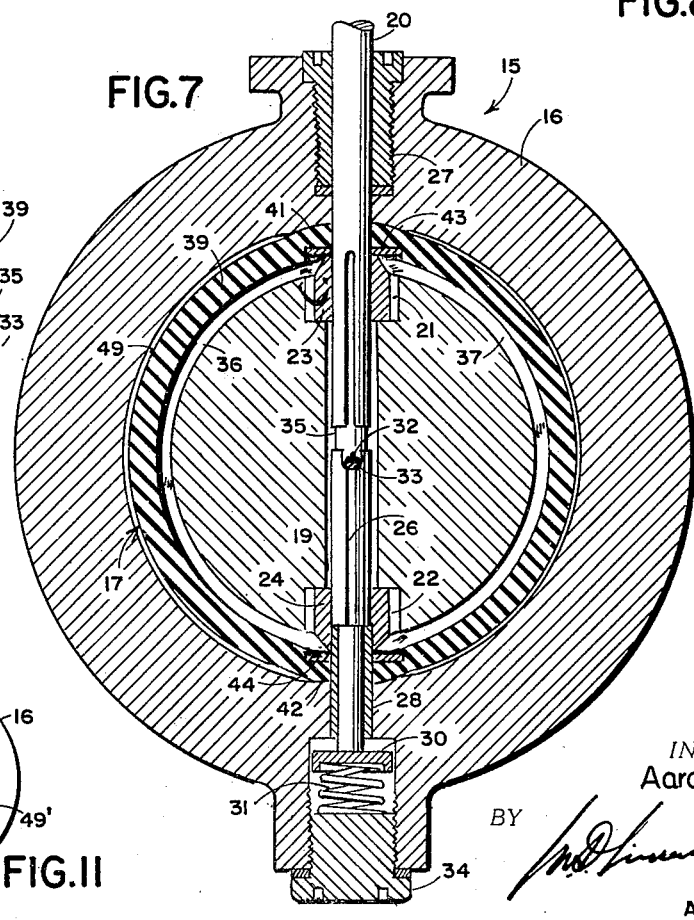
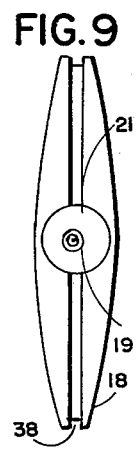
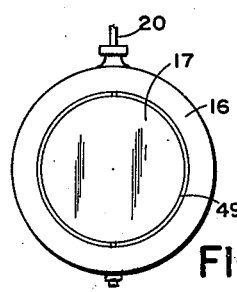
INVENTOR,
Aaron Ryen,
BY
ATTORNEY.

United States Patent Office 3,497,180
Patented Feb. 24, 1970

3,497,180
VALVE HEAD WITH SELECTIVELY EXPANDABLE PERIPHERY
Aaron Ryen, 215 E. Madison Ave.,
Collingswood, N.J. 08108
Filed Oct. 7, 1968, Ser. No. 765,464
Int. Cl. F16k 25/00, 1/22
U.S. Cl. 251—192                                9 Claims

ABSTRACT OF THE DISCLOSURE

The valve operating shaft which is rotatable and slidable in a diametral hole through the disc structure within the barrel body, carries an elliptical cam in each counterbored end of said hole, which cams are keyed to turn with the shaft, but allow the shaft its longitudinal movement. There is an arrangement whereby at a normal position of the shaft to which it is spring-biased, the disc structure will turn with the shaft, and at a longitudinally shifted position, said disc structure will not turn with the shaft, a condition manually created after the disc structure is turned to closing position against a stop. A two-part resilient band within a peripheral groove in the body member of the disc structure, is pressingly held in such groove by a resilient outer envelope covering and housing the remaining disc structure components. This band is of two arcuate parts with the shaft between them; the distal ends of such parts being against the cams. There is a slight clearance between said envelope and the valve body. Operation of the cams which occurs upon turning the shaft in its said shifted position, shifts the arcuate parts and then acts to stress and open them, thus effecting a tight seal between the disc structure and the valve body. The ends of said arcuate parts bear against washers on the shaft within said resilient envelope, to assure a good seal at the cam regions.

---

The present invention relates to butterfly valves, throttle valves and the like, whose general construction comprises a disc turning on a diametral axis inside a valve body which may be a pipe or barrel.

In valves of this class, prior to my previous valve construction set forth in my Patent No. 3,383,086 issued on May 14, 1968, the entire periphery of the disc member was in wiping frictional contact with its associated barrel, during the last stage of closing and the first stage of opening. The resulting wear caused leaks. The attempts of others in this field, brought on additional difficulties with any small advantage gained. My said patented valve solved the problem, by providing, that except at the pintles, no part of the periphery of the disc structure ever comes into contact with the barrel during turning movement to open or close the valve. However, the provision in the disc structure of a system of many moving parts, their mounting, assembly and coordination, involved a comparatively high cost of manufacture; the cam device especially, presenting design, manufacturing and assembly problems. Further, the structure and its mode of operation, allowed an unevenness in the seal around the periphery of the disc structure when the valve was in closed condition.

It is therefore the principal object of this invention, to provide a valve of this type of novel, improved and simplified construction, which retains the advantages and eliminates the disadvantages of my prior valve, making the structure of increased practicability, and easier and more reasonable in cost to manufacture.

Another object thereof, is to provide a valve of the character described, of novel and improved construction and having a new mode of operation to effect the seal whereby the tightness of such seal around the periphery of the disc structure is substantially uniform.

A further object thereof is to provide a novel and improved disc structure in a valve of this kind, wherein even at the pintles there is no contact with the valve body during any turning movement of the disc structure, and there is provision to effect a seal around the entire perimeter of the disc structure, to securely close the valve.

Still another object of this invention is to provide a novel and improved valve of the kind set forth, having the aforementioned attributes and which is efficient in carrying out the purposes for which it is designed.

Other objects and advantages will become apparent as this disclosure proceeds.

For one practice of this invention, the disc structure within the barrel body, comprises a comparatively thin round block having a diametral bore provided with end counterbores, through which passage is a shaft which extends outwardly of the valve body where it is provided with an operating handle. This shaft is free to turn and is capable of some longitudinal sliding movement in said bore and in bearings on the valve body, and is spring-biased to a position where it is keyed to turn said block, so normally the disc structure will turn with said shaft. Said block is snug within a round, thin casing or envelope made of some resilient rubber-like material. The normal outside diameter of said envelope is slightly less than the inner diameter of the barrel, said block has a two-piece band thereon, loose in a peripheral groove, one of said arcuate pieces being to one side of the shaft, and the other of said pieces being to the other side of said shaft. In each of said counterbores, between and in contact with each set of the opposite distal ends of said arcuate band pieces, is an elliptical cam which is keyed to turn with said shaft and to permit longitudinal movement of said shaft; said ends being normally in contact with the minor axes of said cams. At each cam there is a loose washer on the shaft within said envelope; each washer overlapping a set of said band ends and is pressed on by said envelope wall. The disc structure comes against a stop when in closing position. Then, upon sliding the shaft to release itself from the block, and further turning of said shaft, the cams will first press upon the distal ends of said peripheral band pieces to shift said pieces away from the block, and after the mid-points of said band pieces are stopped, said cams will stress and act to open said arcuate band pieces, thereby asuring a seal of substantially uniform tightness around the entire periphery of the disc structure with the valve body, as will be explained.

In the accompanying drawing forming part of this specification, similar characters of reference indicate corresponding parts in all the views.

FIG. 1 is a side view of a valve embodying the teachings of this invention. A stop for the disc structure is shown.

FIG. 2 shows the valve stem or shaft as it is called herein, the cams thereon and the two segments of the band to be acted on by said cams to cause diametrical enlargement of the outer resilient envelope which encases the block body whose periphery holds said two-part band.

FIG. 3 is an enlarged elevational view of a cam, two of which are used in this valve.

FIG. 4 is a top plan view of FIG. 3.

FIG. 5 is a face view of the resilient envelope, which is the outer casing of the disc structure.

FIG. 6 is a section taken at line 6—6 in FIG. 5.

FIG. 7 is an enlarged section taken through the valve at line 7—7 in FIG. 1, showing the disc structure thereon at closing position, and ready for the manipulation whereby the enlargement of the resilient envelope will be effected to tightly close the valve.

FIG. 8 is an end view of the block which is the carrier of the components to be housed in said envelope.

FIG. 9 may be deemed the top plan or bottom view of FIG. 8.

FIG. 10 is an enlarged fragmentary view shown in section, of the provision to hold the cams inactive while the disc structure is being turned in either direction, and to have the cams do their work to tightly close the valve when the disc structure has reached closing position.

FIG. 11 is an end view of reduced size of a valve of slightly modified construction.

In the drawing, the specific valve illustrated, is designated generally by the numeral 15, and comprises a barrel valve body 16 of cylindrical interior, holding a disc or head structure denoted generally by the numeral 17, which consists of a relatively thin round block 18 having a diametral bore 19 through which extends a shaft 20 which is free to turn therein, and is also capable of some longitudinal movement therein. Said bore has end counterbores 21 and 22, which respectively house the elliptical cams 23 and 24, which are keyed to turn with said shaft, but allow said shaft some longitudinal movement. Hence there is provided for each cam, a key as 25 held fast thereto, but set to be engaged in the lengthwise shaft groove or keyway 26 so that the cams turn with the shaft, but allow the shaft longitudinal movement. Said shaft is of course suitably journalled in bearing structure on the valve body as at 27 and 28, and may be constructed as shown to permit the assembly, which needs no further detailed description as to dimensions. In the embodiment illustrated, said shaft is vertical, as no doubt would be its usual position in practice. Its upper end extends upwardly out of the valve body where it terminates in a handle 29. Its lower end terminates on a disc 30 within a plugged socket, housing a stressed compression coil spring 31 bearing against said disc 30 and the plug 34, whereby the shaft 20 is biased upwardly, so that normally, the pin 32 held through the block 18, is engaged by the notch 33, so said block is keyed to the shaft and will turn therewith. The mouth of said notch is communicative with an annular groove 35 in the shaft, so upon pushing the shaft downward by pressing down on its handle 29, said pin 32 will leave said notch and be free to travel in said annular groove, that is, now upon turning the handle while so pressed down, the disc structure 17 will not move with the shaft.

Said block 18 has a segmental peripheral band which comprises the two rod pieces 36, 37 made of resilient material, positioned one to one side and the other to the other side of the operating shaft 20, and their ends bead against the cams 23 and 24 as shown. Each of these rod pieces is bent in arcuate form, and preferably sits along and extends outwardly of a peripheral groove 38 in said block. Said block and its appurtenances are snugly held in a resilient round envelope 39, made for instance of rubber or neoprene, one face of which may have a central boss 40, which is threaded to accommodate the pin 32, which is also threaded tight through an aligned threaded hole in the block 18, to reach into the annular groove 35 in the shaft 20. The periphery of said envelope 39 presses against segments 36, 37, holding them downward in the peripheral groove 38. The normal outside diameter of said envelope is a bit less then the internal diameter of the barrel 16, so normally there will exist the space 49. At the region of each of the cams, the envelope is enlarged to contact the barrel 16, as indicated at 41 and 42. These enlargements are not abrupt, but generally reduce to the general diameter of the envelope so the clearance between the peripheral wall of the envelope and the barrel, exists substantially along the entire length of the band segments. When the washers denoted by the numerals 43, 44 are not present, the fit at said enlargements should make a good seal. When said washers are included, such enlargements are unnecessary, and the slight clearance 49 may extend around the entire disc structure 17, as will now be explained.

FIG. 7 shows the valve in normal condition. The pin 32 is engaged in the notch 33. The space 49 exists. Now, to close the valve, the handle 29 is turned to bring the disc structure 17 to closing position which it is at when stopped by the stop 45. Now, upon pressing down on said handle, said pin 32 will leave the notch 33, and will enter the region to ride in the annular groove 35, which it will enter upon further turning of the handle, whereupon the cams 23 and 24, in turning, will first shift the arcuate band segments 36 and 37 outward to expand the envelope 39, until their center regions could move no more, whereupon further movement of said cams will cause said arcuate members to be stressed and their diameter will increase, that is, said arcuate members will open a bit. Their distal ends will press said envelope outwardly and thus enlarge its diameter until said envelope will be in pressing contact all around its periphery with the valve body 16 and the valve will be tightly closed. To open the valve, the handle is turned in reverse direction until the pin 32 again enters the notch 32 by action of the spring 31, whereupon the disc structure 17 will turn with the shaft 20.

The said washers 43 and 44, when included, are loose on the shaft 20, within the envelope 39. The washer 43 rests across and is pressed by the envelope against one set of distal ends of said arcuate band pieces 36, 37 on the outer peripheries of said pieces. The washer 44 rests across and is pressed by the envelope against the other set of distal ends of said band pieces on the peripheries of said pieces. When said arcuate pieces are caused to open by cam action in the closing of said valve, such ends press said washers whereupon the envelope walls thereat will be forced outwardly, and create a good seal thereat. It is evident that when the washers are used in the assembly as shown, the space 49' may exist around the entire disc structure 17, which in such instance may be true circular, as in FIG. 11.

It is preferred that the faces of the envelope 39 be bevelled around their perimeters so the actual peripheral wall of the envelope is very narrow as shown at 46, so the stretching and compression action caused by the outward movement of the arcuate pieces 36, 37, against the envelope's peripheral wall is concentrated and localized to that part of the wall which bears against the barrel's interior when the disc structure 17 is in position to close the valve. This is aided by having the shape of the block 18, in double convex form.

Of importance to note is that during all turning movement of the disc structure 17, there is an absence of wiping action between the bearing structures, on the barrel's interior, and that when the washers 43 and 44 are used, there is no wiping action around the entire periphery of the disc structure 17.

This invention is applicable to barrels of different cross-section with their disc structures made to match respectively. In all instances, the shaft 20 would be central, in symmetrical relation to the disc perimeter, which may be of any rectangle, regular polygon, or the general practice of having the disc structure circular as herein shown, or elliptical, and it is believed that all this is readily understandable to those versed in the art, so no further illustration is necessary.

I claim:

1. In a valve, the combination with a valve body, of a head structure rotatably positioned therein for movement between an open position and a closing position, a stop element on the valve body, adapted to stop the head structure from turning further after it has reached closing position; said head structure comprising an outer envelope of resilient material, a block member within said envelope, a shaft rotatably and longitudinally slidably carried on said block member, along a face of said block member and in symmetry in relation to the perimeter of said block member, first cooperative means on said shaft and block member, arranged to limit the sliding movement of said shaft between a first position and a second position on the block member, and to hold said shaft and block member in engagement to turn together when the shaft is at said first position, and to release the shaft for rotation on the block body when said shaft is at its said second position; said shaft extending tightly, but rotatably and longitudinally slidably through the peripheral wall of said envelope and outwardly of the valve body, handle means on the exterior part of said shaft; said shaft being rotatable and longitudinally slidable on the valve body, a band structure loose on the periphery of said block member and in longitudinal contact with nearly the entire inner peripheral wall of said envelope; said band structure comprising two substantially identical pieces of resilient material, straddling said block member, one such piece at one side and the other piece at the other side of said shaft; there being a slight clearance between the peripheral wall of the envelope and the valve body substantially along the entire length of said band pieces, two substantially identical cams on said shaft, each respectively positioned between one set of corresponding distal ends of said band pieces, second cooperative means on said cams and shaft, engaging said cams and shaft whereby they turn together, but allowing said shaft longitudinal movement therethrough, and means on said block member maintaining said cams in their position between said distal ends of the band pieces, whereby on turning the shaft further after the disc structure has been turned to reach closing position and said shaft is shifted to its second position, said cams will push the said distal ends whereby said band pieces will first move away from the block member and then will be opened a bit, thereby expanding said envelope to effectively close the valve and said band pieces and envelope will be biased to return to normal condition which is accomplished by turning said shaft in reverse direction while at said second position.

2. A valve as defined in claim 1, wherein the shaft is through a bore through the block member, which bore has its ends opening in the periphery of said block member; the cam position maintenance means including counterbores at each end of said bore; said cams being positioned in said counterbores respectively.

3. A valve as defined in claim 1, including means biasing the shaft to one of its positions on the block member.

4. A valve as defined in claim 3, wherein said shaft is biased to normally be at its first position on the block member.

5. A valve as defined in claim 1, including two washers within the envelope, bearing against its peripheral wall, and positioned on said shaft; each washer contacting the outer surfaces of the distal portions of said band pieces whereby on the opening of said band pieces, said washers will be pushed towards the valve body thereby effecting a tight seal between the envelope and the valve body in the region of said washers.

6. A valve as defined in claim 5, wherein the mentioned slight space is around the entire disc structure when said band pieces are in normal rest position about the disc structure.

7. A valve as defined in claim 1, wherein the first cooperative means comprises a pin extending from the block member, the shaft being provided with a peripheral groove about its axis, said pin extending into said groove and engaged therein, thereby determining the first position of the shaft on the block member, and said groove being communicative with a longitudinal notch along said shaft; said pin being adapted to enter said notch and be engaged therein upon turning the shaft on the block member, thereby determining the second position therefor.

8. A valve as defined in claim 7, including spring means biasing the shaft whereby it will slide so that said pin will enter said notch when said pin is at such notch.

9. A valve as defined in claim 1, wherein the second cooperative means comprises a key fixed to each cam respectively, each key being engaged in groove structure along the shaft whereby the shaft and cams will turn together; said engagement allowing the shaft to slide longitudinally through the cams.

References Cited

UNITED STATES PATENTS

| 2,696,968 | 12/1954 | DeFillips | 251—192 |
| 2,843,353 | 7/-1958 | Marden | 251—192 |
| 2,983,478 | 5/1961 | Masheder | 251—188 |
| 3,383,065 | 5/1968 | Ryen | 251—306 XR |

FOREIGN PATENTS 680,520 10/1952 Great Britain.

HENRY T. KLINKSIEK, Primary Examiner

U.S. Cl. X.R.

251—306